Aug. 17, 1948.  W. A. SETTLE  2,447,435
TIRE TRUCK
Filed Feb. 11, 1946
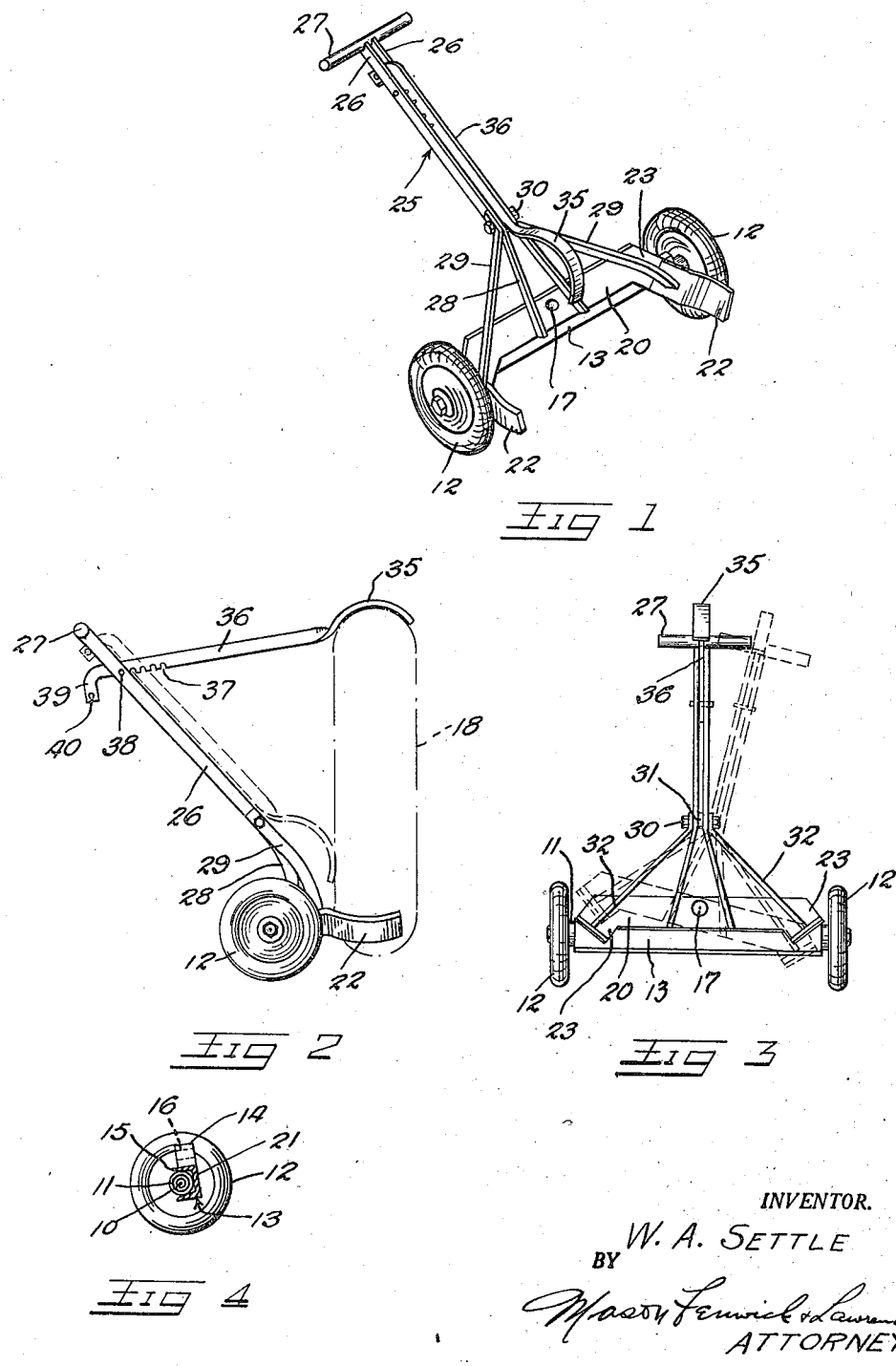
INVENTOR.
W. A. SETTLE
BY
Mason Fenwick & Lawrence
ATTORNEYS Patented Aug. 17, 1948

2,447,435

UNITED STATES PATENT OFFICE 2,447,435

TIRE TRUCK

Walter A. Settle, Jefferson, Oreg.; Nila R. Settle executrix of said Walter A. Settle, deceased Application February 11, 1946, Serial No. 646,791

5 Claims. (Cl. 214—65.4)

This invention relates to tire trucks.

An object of the invention is the provision of a truck for transporting heavy truck tires to and from a vehicle wheel including means for rocking the tire to either side of the vertical in order to position said tire properly for aligning the usual bolt openings in the central disk of the demountable rim with the circumferentially arranged threaded bolts projective from the wheel hub.

Another object of the invention is the provision of a foldable truck for transporting heavy truck tires to and from a vehicle wheel, said truck including a tire support rockably mounted in parallel relation with a wheel-supported axle so that the usual bolt openings in the disk of a demountable rim may be aligned with the threaded bolts projecting from the hub of the vehicle wheel, said support also being rockable at right angles to the prior rocking movement so that the tire may be raised or lowered.

A further object of the invention is the provision of a truck for transporting heavy truck tires to and from a vehicle wheel, in which an operating handle and a tire support carried by the handle are rockable in a plane parallel to a wheel-supported axle on which the handle is mounted and also in a plane at right angles to said axle so that the tire mounted on the usual rim may be lowered or raised or tilted to either side of a vertical for aligning the bolt holes in the disk of the rim with the threaded bolts projecting laterally from the hub of the vehicle wheel, an adjustable means being employed in cooperation with the tire support in the axle for retaining the tire on the truck.

This invention consists in the novel construction, arrangement and combinations of parts hereinafter more particularly described and claimed.

In the drawings:

Figure 1 is a view in perspective of a truck constructed in accordance with the principles of my invention.

Figure 2 is a side view of the truck showing the manner in which a tire is carried.

Figure 3 is a front view of the truck disclosing the manner in which the support for the tire is tilted in a plane parallel to the wheel-supported axle of the truck, and Figure 4 is a fragmentary transverse vertical section through the axle of the truck.

Referring more particularly to the drawings, 10 designates an axle on which a sleeve 11 is mounted. A wheel 12 at each end of the sleeve carries said axle. A bar 13, U-shaped in cross section, receives the sleeve and is welded thereto so that the sleeve and bar are rockable on the axle.

A block 14 is secured to the outer face of a flange 15 of the bar 13 and projects upwardly from said bar. A perforation 16 in the block receives a pivot pin 17 for a purpose which will be presently described.

A support for a tire 18 includes an oscillating plate 20 which is in flat contact with a flat wall 21 of the bar 13. The plate has a perforation which receives the pin 17 carried by the block 14 so that said plate may be rocked on the pin. An arm 22 projects forwardly from each end of said plate. The outer ends of said arms are curved to conform to the curvature of the side walls and tread of a tire to be supported thereby. These arms form a saddle to receive the lower portion of the tire.

It will be noted that each end of the plate is provided with an angular offset 23 and it is from such offsets that the arms 22 project so that said arms are located in a lower horizontal plane than the bottom edge of the plate 20. The angular offsets properly position the curved arms 22 so that the saddle thus formed will neatly receive the tire.

A handle generally designated by the numeral 25 is formed a spaced parallel rods 26 connected at the outer ends thereof to a hand-grip 27. The inner ends 28 of the rods are bent downwardly in a divergent manner and are secured in any approved manner to one face of the plate 20. A brace bar 29 is located at each side of the handle 25. The upper ends of said brace bars are bolted at 30 to the rods 26 with a spacing collar 31 received by the bolt and disposed between the rods. The lower ends 32 of the brace bars diverge and are secured in any approved manner to the arms 23 for aiding in supporting the load on said arms when a truck tire is resting in the saddle.

A top support for the tire 18 includes a curved shoe 35 neatly fitting the upper portion of the tire 18. An integrally formed rod 36 extends rearwardly from said shoe and has spaced notches 37 adapted to be received by a pin 38 carried by the upper ends of the spaced rods 26. The outer end of the rod 36 is bent downwardly at 39 and a pin 40 mounted in the free end of the portion 39 prevents the rod 36 from being displaced from its position between the rods 26.

When not in use for aiding in retaining a tire in position on the saddle, the rod 36 and the integrally formed shoe 35 are moved downwardly to the dotted line position shown in Figure 2 with the pin 40 preventing displacement of the rod from the handle 25. At this time, one of the notches 37 in the rod 36 will engage the pin 38.

The operation of the truck is as follows:

When applying a heavy tire to the truck it is necessary to lift the tire since the handle may be tilted to the dotted line position shown in Figure 3 whence the tire may be rolled into position on the saddle and seated between and on the curved arms 22 which constitutes said saddle. However, the supporting rod 36 and shoe 35 are swung to an elevated position before the tire is placed in the saddle. In other words, the shoe is raised with the rod 36 pivoting on the pin 38 until the pin 40 engages the under faces of the members 26. At this time, the rod will remain in an inoperative position.

After the tire is seated in the saddle, the rod 36 and attached shoe are swung forwardly until the shoe engages over the top of the previously positioned tire. The truck may now be moved to the vehicle wheel which requires a tire-replacement.

The handle 25 of the tire transporting truck is either raised or lowered to obtain the proper elevation so that the holes in the disk of the demountable rim will approximately align with the projecting threaded bolts on the hub of the vehicle wheel.

In order to complete the alignment, it may be necessary to rock the handle to one side of a vertical plane passing through the pivot pin 17 carried by the passage 16 in the block 14 attached to the member 13 which is rockable on the axle 10. When the proper alignment has been made, the truck can be moved toward the hub of the vehicle wheel sufficiently to cause the bolts to receive the holes in the supporting disk of the rim.

The truck is also employed for transporting tires away from a vehicle wheel. In this case, the saddle is placed beneath a tire after which the shoe 35 is engaged over the top of said tire. With the usual nuts removed from the threaded bolts on hub of the vehicle wheel, the handle 25 may be lowered to slightly raise the tire, and when necessary, the handle may be rocked to one side. By withdrawing the truck from the hub, the tire will be removed readily.

Although a preferred and practical embodiment of the invention is disclosed herein, it is to be understood that various modifications may be made within the scope of the appended claims.

Having thus fully described my invention, I claim:

1. A truck for transporting tires comprising a wheel-supported axle, a handle, a rockable means mounted on the axle with the axle forming the axis for the rockable means, means pivotally attaching the handle on the rockable means so that said handle may not only be rotated on the axle but may be rocked in planes parallel to said axle, an extension on the lower end of the handle to provide a saddle for supporting a tire and means connected to the upper end of the handle for retaining the tire in an elevated position.

2. A truck for transporting tires comprising a wheel-supported axle, a bar rockably mounted on the axle, a handle, means pivotally connecting the lower end of the handle to the bar so that said handle may not only be rocked in planes around the axle as an axis but in planes parallel to said axle, a saddle projecting from the lower end of the handle for supporting a tire, and means at the upper end of the handle for engagement with the upper portion of the tire for retaining the tire in elevated position.

3. A truck for transporting tires comprising a wheel-supported axle, a sleeve received by said axle, a bar having flanges embracing the sleeve and secured thereto, said bar having a flat side, a plate in contact with the flat side, means pivotally mounting the plate on the bar, a handle having the lower end secured to the plate adjacent the pivotal mounting so that the plate may be rocked on the pivotal mounting and also on the axle, curved arms projecting forwardly from the plate, adapted to receive and support a tire and means connected with the upper end of the handle for retaining the tire in an elevated position.

4. A truck for transporting tires comprising a wheel-supported axle, a sleeve received by said axle, a bar having flanges embracing the sleeve and secured thereto, said bar having a flat side, a plate in contact with the flat side, means pivotally mounting the plate on the bar, a handle having the lower end secured to the plate adjacent the pivotal mounting so that the plate may be rocked on the pivotal mounting and also on the axle, curved arms projecting forwardly from the plate, adapted to receive and support a tire, the upper end of the handle being provided with a pin, a rod having notches at one end adapted to be received by the pin, and a curved member at the other end engageable over the top of the tire for retaining the tire in an elevated position.

5. Truck for handling tires comprising a wheel supported axle, a handle having on its lower end spaced tire supporting arms, said handle being pivotally associated with the axle by a pivot intermediate said arms, the axis of said pivot being perpendicular to the axis of the axle.

WALTER A. SETTLE.

REFERENCES CITED

The following references are of record in the file of this patent:

UNITED STATES PATENTS

| Number | Name | Date |
| --- | --- | --- |
| D. 130,351 | Hunt | Nov. 11, 1941 |
| 801,123 | Wheeler | Oct. 3, 1905 |
| 1,035,352 | Johnson | Aug. 13, 1912 |
| 1,892,979 | Clark | Jan. 3, 1933 |
| 2,379,587 | Moore | July 3, 1945 |
| 2,393,602 | Baum | Jan. 29, 1946 |